US009414113B2

(12) United States Patent
Li et al.

(10) Patent No.: US 9,414,113 B2
(45) Date of Patent: Aug. 9, 2016

(54) DISTRIBUTED RESOURCE MANAGEMENT FOR A PLURALITY OF LOCAL MEDIA GATEWAYS TO PROVIDE VIDEO CONFERENCING

(75) Inventors: Gordon Yong Li, San Diego, CA (US); Xuemin Chen, Rancho Santa Fe, CA (US); Arlen J Kirchoff, Jr., Suwanee, GA (US)

(73) Assignee: BROADCOM CORPORATION, Irvine, CA (US)

( * ) Notice: Subject to any disclaimer, the term of this patent is extended or adjusted under 35 U.S.C. 154(b) by 564 days.

(21) Appl. No.: 13/248,210

(22) Filed: Sep. 29, 2011

(65) Prior Publication Data

US 2012/0300017 A1 Nov. 29, 2012

Related U.S. Application Data

(60) Provisional application No. 61/489,152, filed on May 23, 2011.

(51) Int. Cl.

| | |
|---|---|
| *H04N 21/4363* | (2011.01) |
| *H04N 7/15* | (2006.01) |
| *H04L 12/18* | (2006.01) |
| *H04N 21/436* | (2011.01) |
| *H04N 21/643* | (2011.01) |
| *H04N 21/845* | (2011.01) |

(Continued)

(52) U.S. Cl.
CPC ........ *H04N 21/4363* (2013.01); *H04L 12/1827* (2013.01); *H04N 7/15* (2013.01); *H04N 7/152* (2013.01); *H04N 19/103* (2014.11); *H04N 19/164* (2014.11); *H04N 19/184* (2014.11); *H04N 19/196* (2014.11); *H04N 21/2389* (2013.01); *H04N 21/242* (2013.01); *H04N 21/4385* (2013.01); *H04N 21/43615* (2013.01); *H04N 21/64322* (2013.01); *H04N 21/8456* (2013.01)

(58) Field of Classification Search
CPC ............ H04N 7/152; H04N 21/64322; H04N 21/43615; H04L 12/1827
USPC .......................... 379/202.01, 260; 348/14.09
See application file for complete search history.

(56) References Cited

U.S. PATENT DOCUMENTS

| | | | |
|---|---|---|---|
| 7,298,834 B1 * | 11/2007 | Homeier et al. ......... | 379/202.01 |
| 7,453,815 B1 * | 11/2008 | Grabelsky ............... | H04L 43/06 |
| | | | 370/241 |
| 2003/0018795 A1 * | 1/2003 | Ebling .............. | H04L 29/06027 |
| | | | 709/231 |

(Continued)

*Primary Examiner* — Amal Zenati
(74) *Attorney, Agent, or Firm* — Foley & Lardner LLP

(57) ABSTRACT

Media gateways (MGs), grouped into a hierarchy, are operable to provide a multiparty conferencing among client devices. Gateway resources such as processors, Codecs and network interfaces are aggregated at each MG to establish distributed connection sessions based on resource management metrics such as minimizing total network. The distributed connection sessions are utilized to provide the multiparty conferencing. Each MG may aggregate the gateway resources, which may be determined utilizing a look-up table, from other MGs for sharing among the MGs. Each MG may be activated to provide the media gateway controller (MGC) processing utilizing the shared aggregated gateway resources. A MG may be de-activated from the MGC processing when needed and the associated connection sessions may be subsequently released. Gateway resources are managed at each MG based on the resource management metrics in order to establish distributed connection sessions to support the multiparty conferencing among the client devices.

22 Claims, 4 Drawing Sheets

(51) Int. Cl.
   *H04N 21/2389* (2011.01)
   *H04N 21/242* (2011.01)
   *H04N 21/4385* (2011.01)
   *H04N 19/103* (2014.01)
   *H04N 19/164* (2014.01)
   *H04N 19/184* (2014.01)
   *H04N 19/196* (2014.01)

(56) References Cited

U.S. PATENT DOCUMENTS

| | | | |
|---|---|---|---|
| 2006/0098619 A1* | 5/2006 | Nix et al. | 370/352 |
| 2008/0080553 A1* | 4/2008 | Hasty | H04L 1/0002 370/468 |
| 2012/0093048 A1* | 4/2012 | Liu et al. | 370/310.2 |

* cited by examiner

DISTRIBUTED RESOURCE MANAGEMENT FOR A PLURALITY OF LOCAL MEDIA GATEWAYS TO PROVIDE VIDEO CONFERENCING

CLAIM OF PRIORITY

This patent application makes reference to, claims priority to and claims benefit from U.S. Provisional Application Ser. No. 61/489,152 which was filed on May 23, 2011.

The above stated application is hereby incorporated herein by reference in its entirety.

CROSS-REFERENCE TO RELATED APPLICATIONS/INCORPORATION BY REFERENCE

This application also makes reference to:
U.S. application Ser. No. 13/248,454 filed on Sep. 29, 2011;
U.S. application Ser. No. 13/171,097 filed on Jun. 28, 2011;
U.S. application Ser. No. 13/171,123 filed on Jun. 28, 2011;
U.S. application Ser. No. 13/170,503 filed on Jun. 28, 2011; and
U.S. application Ser. No. 13/170,653 filed on Jun. 28, 2011.

Each of the above stated applications is hereby incorporated herein by reference in its entirety.

FIELD OF THE INVENTION

Certain embodiments of the invention relate to video processing. More specifically, certain embodiments of the invention relate to a method and system for distributed resource management for a plurality of local media gateways to provide video conferencing.

BACKGROUND OF THE INVENTION

Multimedia streaming applications, also known as continuous media applications, have become increasingly popular. Multimedia streaming applications may comprise time-sensitive (media) streaming applications and non-time-sensitive (media) streaming applications. Time-sensitive (media) streaming applications such as video conferencing, online TV and VoIP may be utilized to deliver time-sensitive or live media. Non-time-sensitive (media) streaming applications such as video on demand, video downloading and picture-in-picture streaming may stream pre-recorded continuous media data or content stored on so called media servers. Multimedia streaming applications may run on a wide range of consumer electronic devices, ranging from set-top boxes to PDAs and mobile phones, to receive services such as Cable-Television (CATV), and/or Internet Protocol television (IPTV) offered by service providers.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for distributed resource management for a plurality of local media gateways to provide video conferencing, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for distributed resource management for a plurality of local media gateways to provide video conferencing. In various embodiments of the invention, a plurality of media gateways (MGs) may be operable to provide multiparty conferencing among a plurality of client devices. Gateway resources such as processors, Codecs and device/network interfaces may be aggregated at each MG to establish distributed connection sessions at each MG based on resource management metrics. The multiparty conferencing may be implemented or provided by utilizing the distributed connection sessions. In an exemplary embodiment of the invention, the MGs may be grouped into a tree-like hierarchy based on the resource management metrics. The distributed connection sessions for the multiparty conferencing may be established at each MG by minimizing total network power consumption, minimizing total end-to-end latency, and/or maximizing aggregate network bandwidth, for example. Each MG may aggregate the gateway resources, which may be determined utilizing a look-up table indexed via the resource management metrics, from other MGs. The resulting gateway resources aggregated at each MG may be shared among the MGs. In an exemplary embodiment of the invention, each MG may be activated, when needed, to provide the media gateway controller (MGC) processing such as gateway resource management by sharing the aggregated gateway resources. In instances where a specific client device becomes inactive in the call, a serving MG for the specific client device may be de-activated from the MGC processing. Corresponding connection sessions between the specific client device and the serving MG may be subsequently released. Distributed gateway resource management may be performed at each MG based on the resource management metrics to establish distributed connection sessions for the multiparty conferencing.

Figure 1:
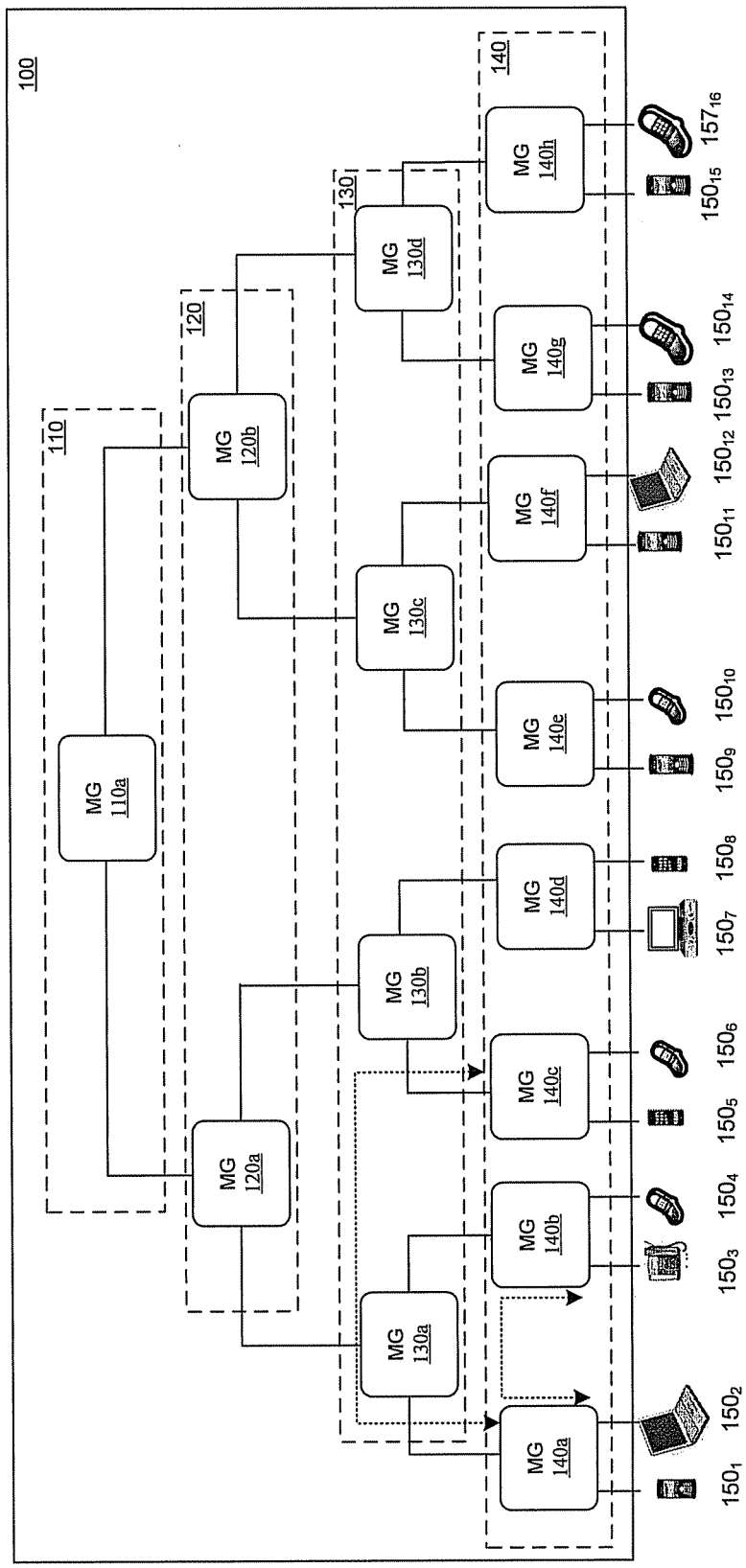
FIG. 1 is a block diagram illustrating an exemplary architecture of a media gateway system that is operable to support distributed resource management for a plurality of local media gateways to provide video conferencing, in accordance with an embodiment of the invention.

FIG. 1 is a block diagram illustrating an exemplary architecture of a media gateway system that is operable to support distributed resource management for a plurality of local media gateways to provide video conferencing, in accordance with an embodiment of the invention. Referring to FIG. 1, there is shown a media gateway hierarchy 100 that may be utilized to support services such as video conferencing.

The media gateway hierarchy 100 comprises a plurality of media gateways (MGs) 110a-140h and a plurality of client devices $150_1$-$150_{16}$. In an exemplary embodiment of the invention, the media gateway hierarchy 100 may comprise a plurality of hierarchy layers 110-140. The MGs 110a-140h may be logically organized or grouped themselves into the corresponding hierarchy layers 110-140 based on various path selection metrics such as resource management metrics or policies. For example, the plurality of MGs 110a-140h may be grouped into the hierarchy layers 110-140 by minimizing the total network power consumption, by minimizing the end-to-end total latency, and/or by maximizing the aggregate network bandwidth. A hierarchy layer such as the hierarchy layer 130 may comprise MGs such as the MGs 130a-130d that may be selected based on resource management metrics or policies such as power consumption, end-to-end latency and/or aggregate network bandwidth. The hierarchy layers 110-140 may be ordered hierarchically according to resource management metrics or policies, which may be selected by the service providers and/or users. For example, a higher hierarchy layer within media gateway hierarchy 100 may comprise MGs corresponding to lower power consumption, lower latency, and/or higher aggregate network bandwidth, in comparison with a lower hierarchy layer. In an exemplary embodiment of the invention, the plurality of MGs 110a-140h may be organized themselves into a tree-like structure within the media gateway hierarchy 100 based on resource management metrics or policies such as minimizing power consumption, minimizing latency and/or maximizing aggregate network bandwidth. The MGs in a low hierarchy layer of the media gateway hierarchy 100 may be point-to-point connected in a tree-like fashion with MGs in the next higher hierarchy layer. For example, in the hierarchy layer 140, both the MGs 140a and 140b may be point-to-point connected to the same MG 130a in the hierarchy layer 130.

A MG such as the MG 140a may comprise suitable logic, circuitry, interfaces and/or code that are operable to implement and manage connection sessions between the MG 140a and other local MGs such as the MG 130a. Depending on gateway processing capability, each MG such as the MG 140a may serve one or more client devices such as the client devices $150_1$-$150_2$ providing services such as a multiparty audio and video (AV) conferencing and messaging among the client devices $150_1$-$150_{16}$. The MG 140a may be operable to perform various media gateway functions such as, for example, packetization, data compression, media streaming and/or protocol processing. In this regard, the MG 140a may be operable to interface with various client devices and/or networks for the desired services. The MG 140a may enable voice, video, data and/or fax to be transmitted or communicated over various communication protocols such as Internet and other protocols, and interface with third party equipment so as to facilitate enhanced voice and data services. For example, the MG 140a may be activated to manage a call originated from the client devices $150_1$ during the multiparty AV conferencing and messaging. In this regard, the MG 140a may be operable to process and connect different types of media streams such as, for example, audio recordings, music and videos, during the call. In an exemplary embodiment of the invention, the MG 140a may provide or perform the media mapping and/or transcoding functions between similar and/or potentially dissimilar networks such as, for example, cable, DLS, mobile networks (2G, 2.5G and 3G radio access networks) and/or private branch exchange (PBX). For example, the MG 140a may be configured to packetize a media stream received from circuit-switched network facilities (trunks, loops) to deliver or communicate the resulting packetized media stream to a packet network such as the Internet.

In an exemplary embodiment of the invention, the MG 140a may operate or function as a (local) media gateway controller (MGC) providing call control and signaling functionality such as, for example, call routing, signaling, call services and the like, to support various telephony applications or features such as 3-way conferencing. The MG 140a may be operable to communicate with other local MGs by means of protocols such as Media Gateway Control Protocol (MGCP) or H.323 or Session Initiation Protocol (SIP). The MG 140a may be operable to set up and manage connection sessions between the MG 140a and other local MGs. The MG 140a may handle the registration and management of gateway resources to support associated connection sessions at the MG 140a. A connection session between the MG 140a and the MG 130a, for example, comprises a sequence of client-server interactions within a timeframe over a connection or link established between the MG 140a and the MG 130a. A connection session may be described through an associated session profile comprising various session parameters such as, for example, type of service (ToS), session ID, addresses and ports, time of live. In an exemplary embodiment of the invention, the MG 140a may aggregate gateway resources such as, for example, media encoders/decoders, processors, and device/network interfaces, from other local MGs. The MG 140a may manage the aggregated gateway resources for sharing among the local MGs to support connection sessions established for the desired services. The MG 140a may activate, maintain, update, and/or terminate the connection sessions per associated session profiles. In an exemplary embodiment of the invention, the MG 140a may be dynamically activated or de-activated in an as needed basis for the MGC processing.

A client device such as the client device $150_1$ may comprise suitable logic, circuitry, interfaces and/or code that are operable to receive services provided from different core networks through the MG 140a. In various exemplary embodiments of the invention, the client device $150_1$ may communicate or exchange information through the MG 140a with other client devices registered to the MG 140a and/or other MGs. In this regard, the client device $150_1$ may be operable to share information with other local client devices such as client devices $150_2$ as well as with remote client devices such as the client devices $150_7$ through the MG 140a. The client device $150_1$ may receive services from service providers as well as networked client devices such as the client devices $150_7$.

In an exemplary operation, the MGs 110a-140h may be organized into different hierarchy layers 110-140 in the media gateway hierarchy 100 to achieve routing metrics or policies such as, for example, minimizing the end-to-end total latency, and/or maximizing the aggregate network bandwidth. Each MG in the media gateway hierarchy 100 may be enabled to perform various MGC processing such as registration and resource management in an as needed basis. Each MG such as the MG 140a may be activated to serve as a local call controller, or a call agent, to support telephony features such as multiparty conferencing. The client devices $150_1$-$150_2$ may communicate with the serving MG 140a over device-dependent interfaces such as cable, DSL, IP LAN, WiFi, Femtocell, LTE and WiMAX. The client devices $150_1$-$150_2$ may communicate with one or more other MGs such as the MGs 130a and 120a via the serving MG 140a. Each MG in the media gateway hierarchy 100 may be operable to establish and manage point-to-point connection sessions during the call. Communication between MGs such as the MGs 140*b* and 130*a* in the media gateway hierarchy 100 may be carried out over corresponding distributed connection sessions to serve the client devices 150$_1$-150$_2$ during the call.

Figure 2:
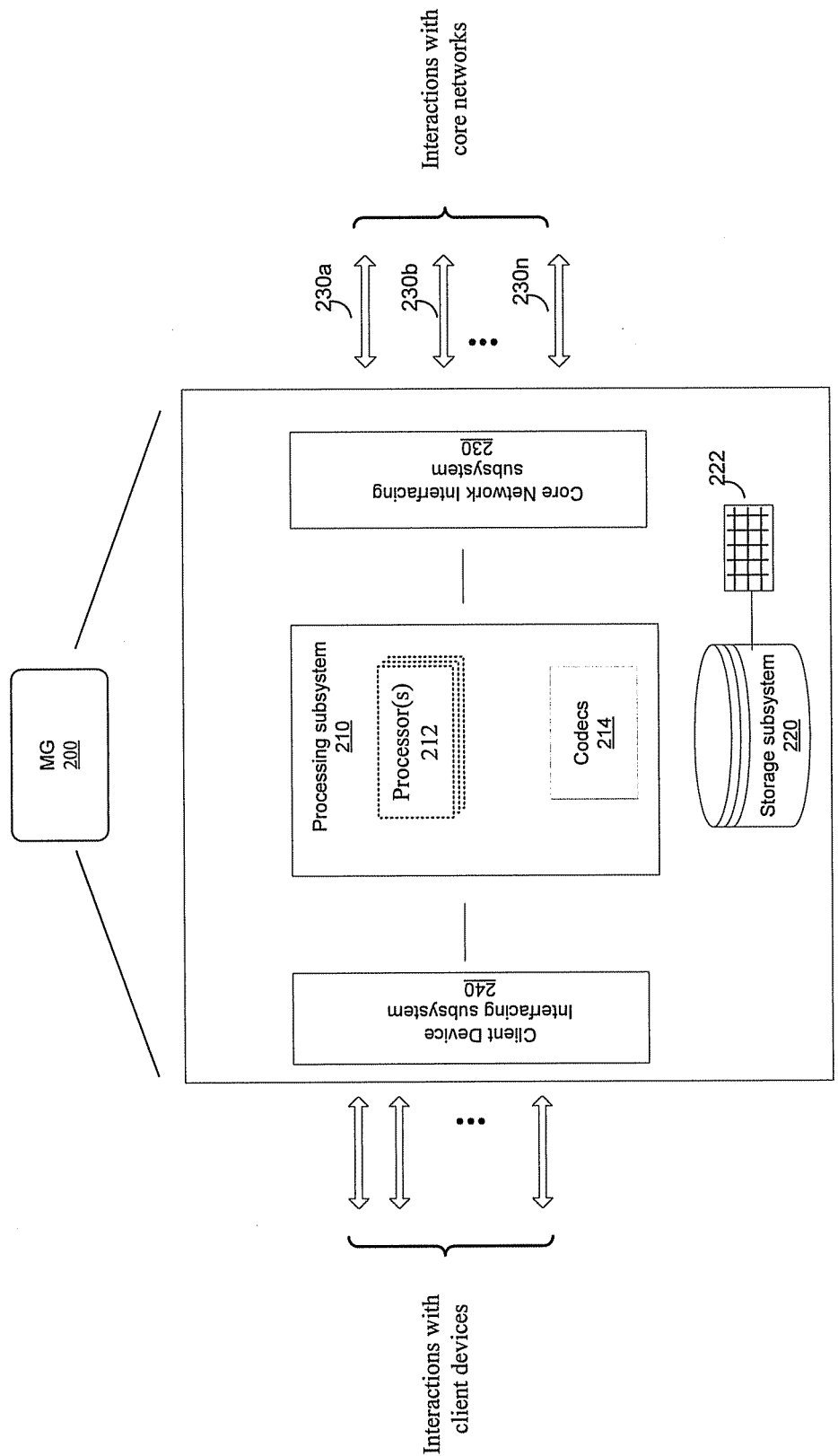
FIG. 2 illustrates an exemplary media gateway that is operable to perform media gateway controller (MGC) processing, in accordance with an embodiment of the invention.

FIG. 2 illustrates an exemplary media gateway that is operable to perform media gateway controller (MGC) processing, in accordance with an embodiment of the invention. Referring to FIG. 2, there is shown a media gateway (MG) 200, which may correspond to the MG 140*a* of FIG. 1.

The MG 200 may comprise a processing subsystem 210, a storage subsystem 220, a core network interfacing subsystem 230, and a client device interfacing subsystem 240. In some instances, the MG 200 may be such that the various components listed above may be distributed or located over multiple devices. Moreover, the components listed above are provided by way of illustration and not of limitation. Other configurations and/or architectures of the MG 200 may be implemented without departing from the spirit and scope of various embodiments of the invention.

The processing subsystem 210 may comprise suitable logic, circuitry, interfaces, and/or code that may be operable to configure and/or control operations of various components and/or subsystems of the MG 200, and/or other devices managed by and/or connected to the MG 200, by utilizing, for example, one or more control signals. The processing subsystem 210 may comprise one or more processors 212, which may be general processors and/or various specialized processors such as video processors, audio processors, and/or security processors. The processing subsystem 210 may comprise one or more Codecs 214, which may comprise DivX, XviD, H.263, or H264 for video, and H.711, H.722, MP3, WMA, or others for audio. While the processing subsystem 210 is shown herein as a single block, the invention needs not be so limited. Accordingly, in instances where the MG 200 is implemented on a distributed platform, some of the operations and/or functions described herein with regard to the processing subsystem 210 may be performed by components that may be located in different devices.

The storage subsystem 220 may comprise suitable logic, circuitry, interfaces, and/or code that may be operable to store data that may be utilized for the operations of the MG 200. For example, the storage subsystem 220 may be utilized to store configuration data, parameters, client device information, client tracking and/or monitoring information, security information, intermediate processing data, and resource management metrics or policies. In this regard, the storage subsystem 220 may comprise a look-up table 222 to store and manage information with regard to the usage or mapping of gateway resources such as Codecs, client device interfaces and core network interfaces in terms of various resource management metrics or policies selected by service providers or users. For example, the look-up table 222 may be indexed utilizing various resource management metrics such as minimizing total network power consumption, minimizing total end-to-end latency, and/or maximizing aggregate network bandwidth. The look-up table 222 may be utilized to determine resources that the MG 200 may aggregate from other MGs for resource management metrics selected by the service providers or users. The storage subsystem 220 may comprise one or more memory devices that may enable permanent and/or non-permanent storage, buffering, and/or fetching of data, code and/or other information which may be used, consumed, and/or handled in the MG 200. The storage subsystem 220 may comprise storage media integrated in the MG 200 and/or one or more removable storage devices. In this regard, the storage subsystem 220 may comprise different memory technologies, including, for example, read-only memory (ROM), random access memory (RAM), Flash memory, solid-state drives (SSDs), and/or field-programmable gate arrays (FPGAs).

The core network interfacing subsystem 230 may comprise suitable logic, circuitry, code, and/or interfaces that may be operable to interface with various core networks such as cable, DSL, GSM, UMTS, TD-SCDMA, LTE, and WiMAX for services such as telephony conferencing and messaging. The core network interfacing subsystem 230 may be operable to support various communication protocols, standards, and/or data transport technologies, for example, DOCSIS, DSL, GSM, UMTS, LTE, WiMAX, WiFi and/or Ethernet. In this regard, each of the connections 230*a*-230*n* may utilize different physical media and/or different physical layer protocols. For example, the connection 230*a* may comprise a DSL over twisted-pair connection whereas and the connection 230*n* may comprise a DOCSIS over coaxial cable connection. Accordingly, the core network interfacing subsystem 230 may enable accessing various services such as telephony conferencing provided from service providers and/or content providers via corresponding core networks. The core network interfacing subsystem 230 may enable communicating data to and/or from third parties. In this regard, the core network interfacing subsystem 230 may support gateway-to-gateway communication and/or interactions between the MG 200 and remote client devices via associated MGs. The core network interfacing subsystem 230 may be operable to concurrently communicate with multiple core networks over the connections 230*a*-230*n* to support services such as multiparty AV conferencing and messaging.

The client device interfacing subsystem 240 may comprise suitable logic, circuitry, code, and/or interfaces that may be operable to communicate information with one or more client devices. The client device interfacing subsystem 240 may be operable to support multiple communication protocols, standards, and/or data transport technologies. In this regard, the client device interfacing subsystem 240 may handle connections to client devices. For example, the client device interfacing subsystem 240 may comprise, one or more wired and/or wireless interfaces, one or more analog and/or digital audio outputs, one or more audio/video interfaces such as such as HDMI and DisplayPort, 60 GHz WiGig wireless connection/interface, one or more USB interfaces, one or more IEEE 1394, and/or one or more telephone jacks.

In an exemplary operation, the MG 200 may communicate with core networks such as cable, DSL, GSM, UMTS, LTE, WiMAX, WiFi and/or Ethernet via the core network interfacing subsystem 230, to receive services. The MG 200 may communicate with the client devices 150$_1$-150$_2$, for example, via the client device interfacing subsystem 240. The processing subsystem 210 may operate as a MGC for MGC processing such as call routing and resource management. The MG 200 may aggregate gateway resources such as Codecs, processors, and interfaces to support services requested by the associated client devices 150$_1$-150$_2$. The MG 200 may utilize the aggregated resources to establish point-to-point distributed connection sessions to communicate the requested services to the client devices 150$_1$-150$_2$ via the client device interfacing subsystem 240.

Figure 3:
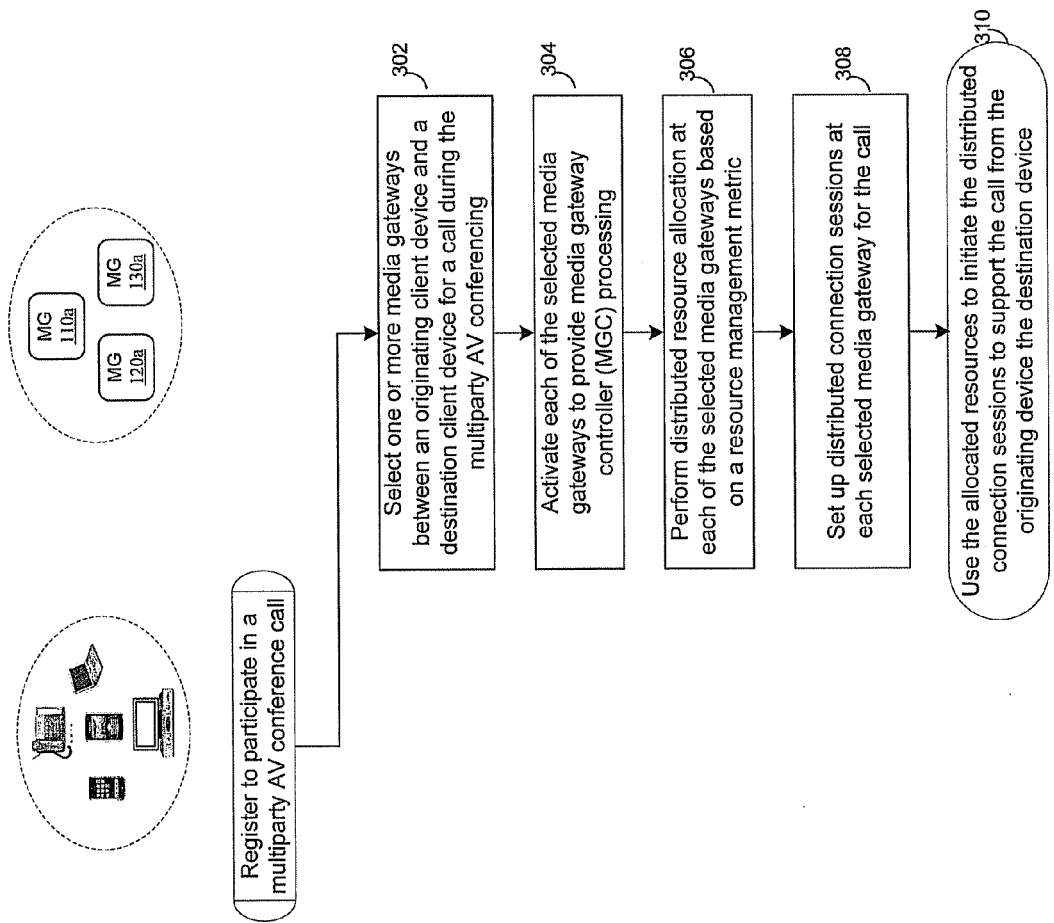
FIG. 3 is a flow chart illustrating exemplary steps that may be performed to provide a multiparty audio and video (AV) conference call utilizing distributed connection sessions, in accordance with an embodiment of the invention.

FIG. 3 is a flow chart illustrating exemplary steps that may be performed to provide a multiparty audio and video (AV) conference call utilizing distributed connection sessions, in accordance with an embodiment of the invention. Referring to FIG. 3, the client devices 150$_1$-150$_{16}$ may register to participate in a multiparty AV conferencing. During the multiparty AV conferencing, a client device such as the client device 150$_1$ may intend to start a call to one or more destination client devices $150_3$ and $150_6$, for example. The exemplary steps may begin with step 302, in which one or more MGs between the originating client device $150_1$ and a destination client device such as the client device $150_3$ may be identified or selected to support the call based on resource management metrics or policies selected by the service providers or users. For example, the MGs 140a, 130a, and 140b may be selected for the call according to one or more resource management metrics such as minimizing the end-to-end total latency. In step 304, each of the selected MGs 140a, 130a, and 140b may be activated to provide the MGC processing. In step 306, at each of the selected MGs, gateway resources such as processors, Codecs and/or interfacing capabilities may be aggregated. For example, a MG such as the MG 140a may communicate with other local MGs such as the MG 130a for available gateway resources which may be shared among the client devices $150_1$-$150_{16}$. Each MG may share the aggregated gateway resources and may perform resource allocation based on one or more resource management metrics. In step 308, each MG may be operable to establish or set up distributed connection sessions at each selected MG for the call. In step 310, each MG may utilize the allocated gateway resources to initiate corresponding distributed connection sessions to support the call to the client devices $150_3$ and $150_6$ from the client device $150_1$.

Figure 4:
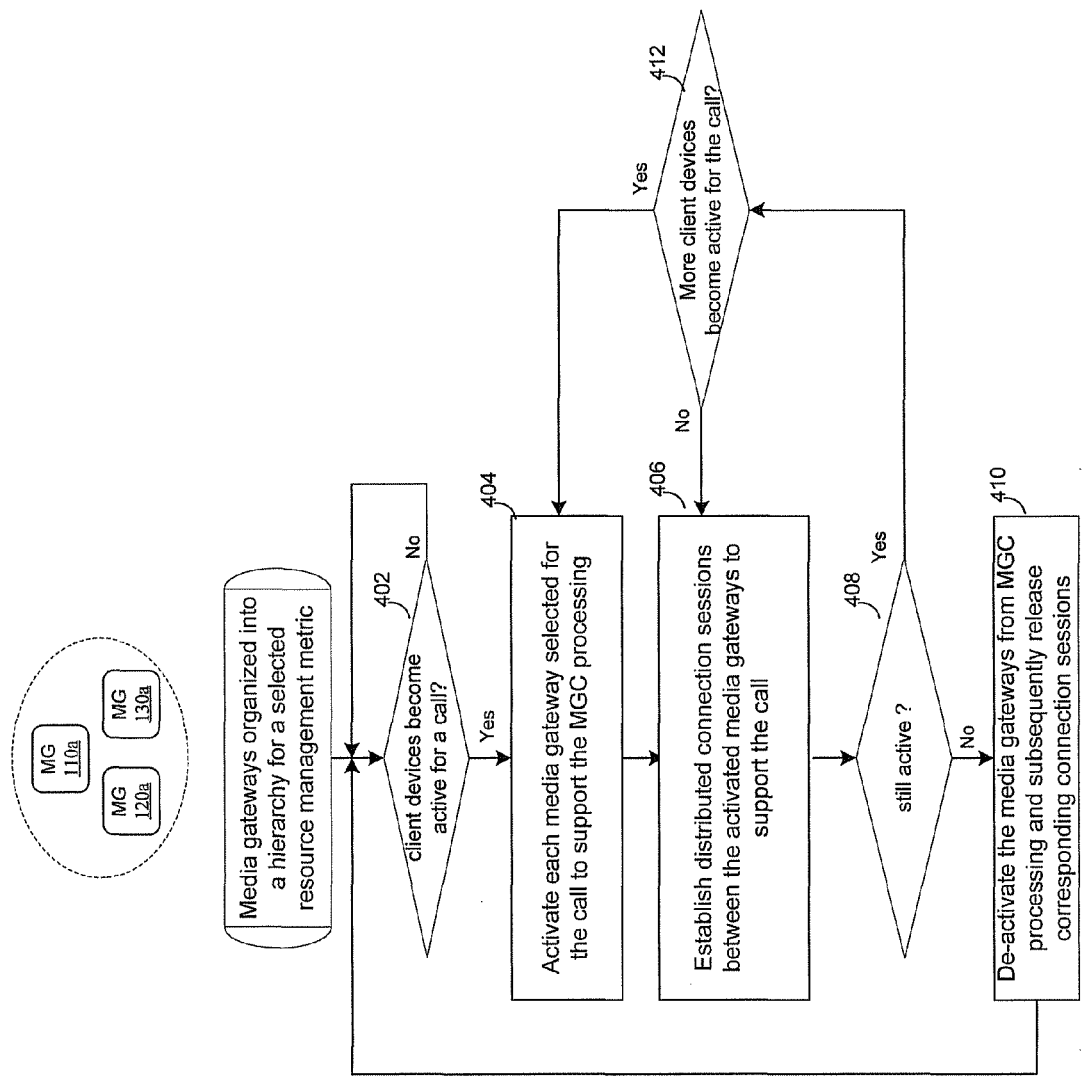
FIG. 4 is a flow chart illustrating exemplary steps that may be performed for dynamically activating or de-activating local media gateways during a multiparty audio and video (AV) conference call, in accordance with an embodiment of the invention.

FIG. 4 is a flow chart illustrating exemplary steps that may be performed for dynamically activating or de-activating local media gateways during a multiparty audio and video (AV) conference call, in accordance with an embodiment of the invention. Referring to FIG. 4, the MGs 110a-140h are organized into a tree-like structure within the media gateway hierarchy 100 according to selected resource management metrics such as minimizing end-to-end total latency. The exemplary steps may begin with step 402, in which it may be determined whether client devices become active to join in a call during multiparty AV conferencing. In instances where the client devices $150_1$ and $150_6$ become active to participate in the call, then in step 404, where the MGs such as the MGs 140a, 130a, 120a, 130b, and 140c selected for the call may be activated to support the MGC processing for the call. In step 406, each of the selected MGs 140a, 130a, 120a, 130b, and 140c may be operable to set up or establish distributed (point-to-point) connection sessions between the activated MGs to support the call. In step 408, it may be determined whether the client devices $150_1$ and $150_6$ are still active for the call. In instances where the client devices $150_1$ and $150_6$ become inactive for the call, then in step 410, where the MGs 140a, 130a, 120a, 130b, and 140c may be de-activated from the MGC processing and may subsequently release corresponding connection sessions established for the call. The exemplary steps may return to the step 402.

In step 402, in instances where no client devices become active for the call during the multiparty AV conferencing, the exemplary steps stay in the step 402. In step 408, in instances where the client devices $150_1$ and $150_6$ are still active in the call, then in step 412, where in instances where more client devices need to become active for the call, the exemplary steps may proceed in step 404. Otherwise, the exemplary steps may proceed in step 406.

Various aspects of a method and system for distributed resource management for a plurality of local media gateways to provide video conferencing. In various exemplary embodiments of the invention, the plurality of MGs 110a-140h may be operable to provide multiparty conferencing among the plurality of client devices $150_1$-$150_{16}$. Gateway resources such as processors, Codecs and network interfaces may be aggregated at each of the plurality of MGs 110a-140h. The aggregated gateway resources may be utilized to establish distributed connection sessions at each of the plurality of MGs 110a-140h based on resource management metrics selected by service providers or users. The multiparty conferencing may start utilizing the distributed connections.

In an exemplary embodiment of the invention, the plurality of MGs 110a-140h may be organized or grouped into a tree-like hierarchy based on the selected resource management metrics. The distributed connections may be established at each of the plurality of MGs 110a-140h by minimizing total network power consumption, minimizing total end-to-end latency, and/or maximizing aggregate network bandwidth. In an exemplary embodiment of the invention, at each of the plurality of MGs 110a-140h, the gateway resources may be aggregated from one or more other MGs of the plurality of MGs 110a-140h. For example, the MG 149a may be operable to aggregate the gateway resources from the MG 130a and the MG 140b to provide gateway processing for the multiparty conferencing. For the selected resource management metrics, the look-up table 222 may be utilized to indicate or determine the aggregated resources required at the MG 149a. The aggregated gateway resources may be shared among the plurality of MGs 110a-140h. In an exemplary embodiment of the invention, each of the plurality of MGs 110a-140h may be activated to operate as media gateway controller (MGC). In this regard, the MGC processing such as call routing and resource management may be performed at each of the plurality of MGs 110a-140h utilizing the shared aggregated gateway resources.

The MGC processing may enable running the multiparty conferencing among the plurality of client devices $150_1$-$150_{16}$. In instances where one or more client devices such as the client devices $150_1$-$150_2$ may become idle, the serving MG 140a mat be de-activated from the MGC processing for the multiparty conferencing. The established connection sessions between the idle client devices and the serving MG 140a may be released upon de-activation of the MGC at the MG 140a. In an exemplary embodiment of the invention, gateway resources may be managed at each of the plurality of MGs 110a-140h based on the selected resource management metrics. Distributed connection sessions may be established at each of the plurality of MGs 110a-140h based on the corresponding gateway resource management.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for distributed resource management for a plurality of local media gateways to provide video conferencing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
    aggregating gateway resources, by a communication system comprising a plurality of media gateways, at each of the plurality of media gateways for multiparty conferencing among a plurality of client devices;
    establishing distributed connection sessions at each of the plurality of media gateways, by the communication system using the aggregated gateway resources to provide the multiparty conferencing,
    determining at least one of a first total network power consumption or first aggregate network bandwidth associated with a network over which the multiparty conferencing is provided for a first configuration of distributed connection sessions, wherein the first aggregate network bandwidth comprises a combined bandwidth across a plurality of links of the network in the first configuration;
    determining at least one of a second total network power consumption or second aggregate network bandwidth associated with the network for a second configuration of distributed connection sessions, wherein the second aggregate network bandwidth comprises a combined bandwidth across a plurality of links of the network in the second configuration;
    selecting one of the first configuration or the second configuration of distributed connection sessions based on which configuration has at least one of a lower total network power consumption or a higher aggregate network bandwidth; and
    providing the multiparty conferencing among the plurality of client devices, by the communication system using the selected configuration of distributed connection sessions.

2. The method of claim 1, further comprising grouping the plurality of media gateways into a tree-like hierarchy based on at least one of the total network power consumption or the aggregate network bandwidth.

3. The method of claim 1, further comprising:
    establishing the distributed connection sessions at said each of the plurality of media gateways for the multiparty conferencing by determining a total network power consumption or an aggregate network bandwidth associated with a network over which the multiparty conferencing is provided for a set of all possible configurations of distributed connection sessions; and selecting one of the set of all possible configurations of distributed connection sessions, wherein the selected configuration has at least one of a minimum total network power consumption or a maximum aggregate network bandwidth.

4. The method of claim 1, further comprising aggregating the gateway resources at each of the plurality of media gateways with one or more other media gateways of the plurality of media gateways.

5. The method of claim 4, further comprising determining the aggregated gateway resources using a look-up table indexed utilizing the at least one of the power consumption, the latency, or the aggregate bandwidth.

6. The method of claim 5, further comprising sharing the aggregated gateway resources among the plurality of media gateways to establish the distributed connection sessions at each of the plurality of media gateways.

7. The method of claim 6, further comprising providing media gateway controller processing at each of the plurality of media gateways utilizing the shared aggregated gateway resources.

8. The method of claim 7, further comprising running the multiparty conferencing at each of the plurality of media gateways based on the corresponding media gateway controller processing.

9. The method of claim 7, further comprising de-activating the media gateway controller processing at a first media gateway of the plurality of media gateways, responsive to a client device connected to the first media gateway becoming inactive or idle, while maintaining media gateway controller processing at a second media gateway of the plurality of media gateways for the multiparty conferencing.

10. The method of claim 9, further comprising releasing a corresponding established distributed connection session between the client device and the first media gateway, responsive to de-activating the media gateway controller processing at the first media gateway.

11. The method of claim 1, wherein the first configuration includes a first set of distributed connections between the plurality of media gateways.

12. The method of claim 11, wherein the second configuration includes a second set of distributed connections between the plurality of media gateways.

13. A system for processing signals, the system comprising:
    one or more circuits for use in at least one of a plurality of media gateways that are configured to provide multiparty conferencing among a plurality of client devices, said one or more circuits being configured to:
    aggregate gateway resources at each of the plurality of media gateways for the multiparty conferencing;
    utilize the aggregated gateway resources to establish distributed connection sessions at each of the plurality of media gateways for the multiparty conferencing;
    determine at least one of a first total network power consumption or first aggregate network bandwidth associated with a network over which the multiparty conferencing is provided for a first configuration of distributed connection sessions, wherein the first aggregate network bandwidth comprises a combined bandwidth across a plurality of links of the network in the first configuration;
    determine at least one of a second total network power consumption or second aggregate network bandwidth associated with the network for a second configuration of distributed connection sessions, wherein the second aggregate network bandwidth comprises a combined bandwidth across a plurality of links of the network in the second configuration;

select one of the first configuration or the second configuration of distributed connection sessions based on which configuration has at least one of a lower total network power consumption or a higher aggregate network bandwidth; and utilize the selected configuration of distributed connection sessions to provide the multiparty conferencing among the plurality of client devices.

14. The system according to claim 13, wherein the one or more circuits are further configured to group the plurality of media gateways into a tree-like hierarchy based on at least one of the total network power consumption or the aggregate network bandwidth.

15. The system according to claim 13, wherein the one or more circuits are further configured to establish the distributed connection sessions at each of the plurality of media gateways for the multiparty conferencing by determining a total network power consumption or an aggregate network bandwidth associated with a network over which the multiparty conferencing is provided for a set of all possible configurations of distributed connection sessions and selecting one of the set of all possible configurations of distributed connection sessions, wherein the selected configuration has at least one of a minimum total network power consumption or a maximum aggregate network bandwidth.

16. The system according to claim 13, wherein the one or more circuits are further configured to aggregate the gateway resources at each of the plurality of media gateways from one or more other media gateways of the plurality of media gateways.

17. The system according to claim 16, wherein the aggregated gateway resources are determined using a look-up table indexed utilizing at least one of the power consumption, the latency, or the aggregate bandwidth.

18. The system according to claim 17, wherein the one or more circuits are further configured to share the aggregated gateway resources among the plurality of media gateways to establish the distributed connection sessions at each of the plurality of media gateways.

19. The system according to claim 18, wherein the one or more circuits are further configured to provide media gateway controller processing at each of the plurality of media gateways utilizing the shared aggregated gateway resources.

20. The system according to claim 19, wherein the one or more circuits are further configured to run the multiparty conferencing at each of the plurality of media gateways based on the corresponding media gateway controller processing.

21. The system according to claim 19, wherein the one or more circuits are further configured to:

de-activate the media gateway controller processing at a first media gateway of the plurality of media gateways, responsive to a client device connected to the first media gateway becoming inactive or idle, while maintaining media gateway controller processing at a second media gateway of the plurality of media gateways for the multiparty conferencing; and release a corresponding established distributed connection session between the client device and the first media gateway, responsive to deactivating the media gateway controller processing at the first media gateway.

22. A method for processing signals, the method comprising:

performing distributed gateway resource management, by a communication system comprising a plurality of media gateways, at each of the plurality of media gateways;

determining at least one of a first total network power consumption or first aggregate network bandwidth associated with a network over which the multiparty conferencing is provided for a first configuration of distributed connection sessions, wherein the first aggregate network bandwidth comprises a combined bandwidth across a plurality of links of the network in the first configuration, wherein the first configuration includes a first set of distributed connections between the plurality of media gateways;

determining at least one of a second total network power consumption or second aggregate network bandwidth associated with the network for a second configuration of distributed connection sessions, wherein the second aggregate network bandwidth comprises a combined bandwidth across a plurality of links of the network in the second configuration, wherein the second configuration includes a second set of distributed connections between the plurality of media gateways;

selecting one of the first configuration or the second configuration of distributed connection sessions based on which configuration has at least one of a lower total network power consumption or a higher aggregate network bandwidth; and establishing distributed connection sessions at each of the plurality of media gateways based on the distributed gateway resource management using the selected configuration of distributed connection sessions to provide multiparty conferencing among a plurality of client devices.

* * * * *